(12) United States Patent
Nadolny et al.

(10) Patent No.: US 8,830,459 B2
(45) Date of Patent: Sep. 9, 2014

(54) DEVICE FOR DEMONSTRATING AND TESTING THE COSMETIC QUALITIES OF AN OPHTHALMIC LENS

(75) Inventors: Carole Nadolny, Charenton-le-Pont (FR); Sylvie Tantin, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 310 days.

(21) Appl. No.: 12/989,879

(22) PCT Filed: May 15, 2009

(86) PCT No.: PCT/FR2009/050906
§ 371 (c)(1),
(2), (4) Date: Oct. 27, 2010

(87) PCT Pub. No.: WO2009/153472
PCT Pub. Date: Dec. 23, 2009

(65) Prior Publication Data
US 2011/0069304 A1 Mar. 24, 2011

(30) Foreign Application Priority Data
Jun. 12, 2008 (FR) ...................................... 08 53897

(51) Int. Cl.
*G01N 21/00* (2006.01)
*G01M 11/02* (2006.01)
(52) U.S. Cl.
CPC ................................ *G01M 11/0264* (2013.01)
USPC ........................................ 356/239.2; 356/124
(58) Field of Classification Search
CPC ............ G01N 21/8803; G01N 21/958; G01N 2021/958; G01N 2021/9583; G01M 11/0214; G01M 11/0264; G01M 11/0278
USPC ................ 356/124, 239.2; 348/128; 359/440; 382/141, 148
See application file for complete search history.

(56) References Cited

U.S. PATENT DOCUMENTS

| 1,336,040 | A | 4/1920 | Mathewson |
| 1,803,473 | A | 11/1927 | Johnston et al. |

(Continued)

FOREIGN PATENT DOCUMENTS

| EP | 1887339 | 2/2008 |
| FR | 2907548 | 4/2008 |
| GB | 2293023 | 3/1996 |

OTHER PUBLICATIONS

Search Report Jan. 29, 2009.

*Primary Examiner* — Gregory J Toatley
*Assistant Examiner* — Rufus Phillips
(74) *Attorney, Agent, or Firm* — Sofer & Haroun, LLP

(57) ABSTRACT

A device is provided for demonstrating and testing the cosmetic qualities of an ophthalmic lens by viewing, the device comprising both a bearing wall (2) for bearing against a fixed surface and provided on its face opposite from its bearing face with a viewing target (3), and also a support wall (4) for supporting said lens and placed at a distance lying in the range 20 mm to 50 mm from said face of said bearing wall (2) that is provided with the target. According to the invention, the device is constituted by a support part (1) constituted by a channel-section member having its flanges forming said bearing surface (2) and said support wall (4), the support wall being provided with at least one orifice (5) of dimensions smaller than the dimensions of said lens, and said bearing surface and said support surface being inclined relative to each other by an angle lying in the range 0° to 25°.

6 Claims, 6 Drawing Sheets

(56) References Cited

U.S. PATENT DOCUMENTS

| | | | |
|---|---|---|---|
| 2,267,961 A * | 12/1941 | Tillyer et al. | 356/124 |
| 2,566,058 A | 2/1948 | Donohue et al. | |
| 2,546,329 A | 7/1948 | Barile et al. | |
| 3,794,429 A * | 2/1974 | Koeniger | 356/124 |
| 5,528,357 A * | 6/1996 | Davis | 356/124 |
| 5,812,260 A * | 9/1998 | Louisnathan | 356/239.1 |
| 6,068,379 A * | 5/2000 | Kempf | 359/838 |
| 6,088,116 A * | 7/2000 | Pfanstiehl | 356/445 |
| 6,208,475 B1 * | 3/2001 | Yamamoto et al. | 359/808 |
| 6,496,253 B1 * | 12/2002 | Vokhmin | 356/124 |
| 2002/0071111 A1 | 6/2002 | Epstein | |

* cited by examiner

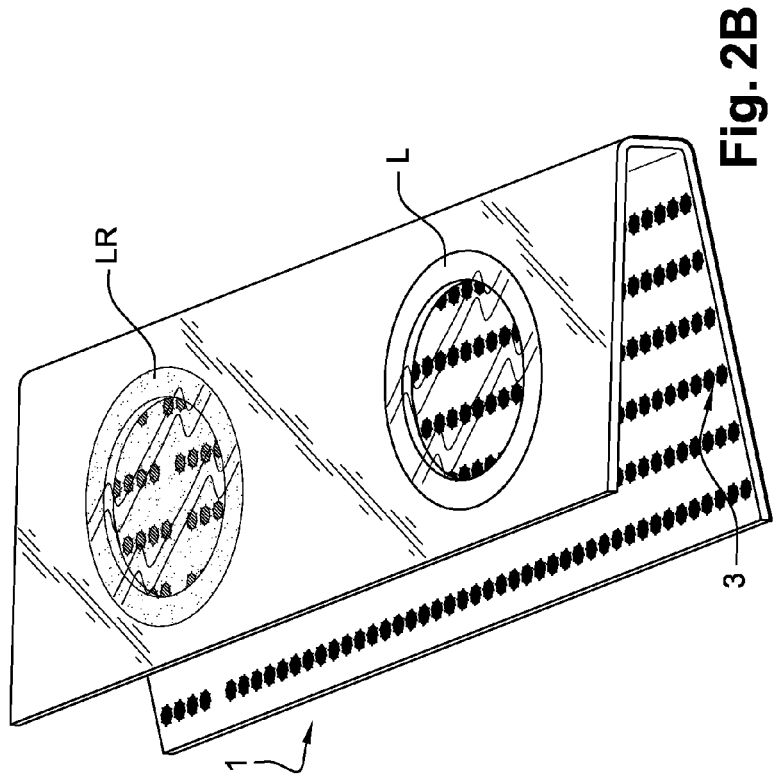
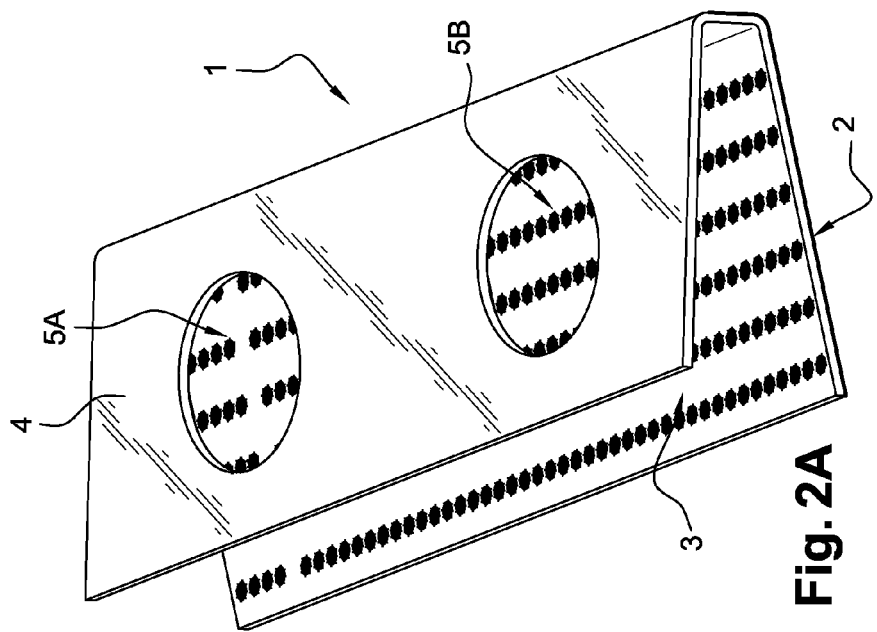

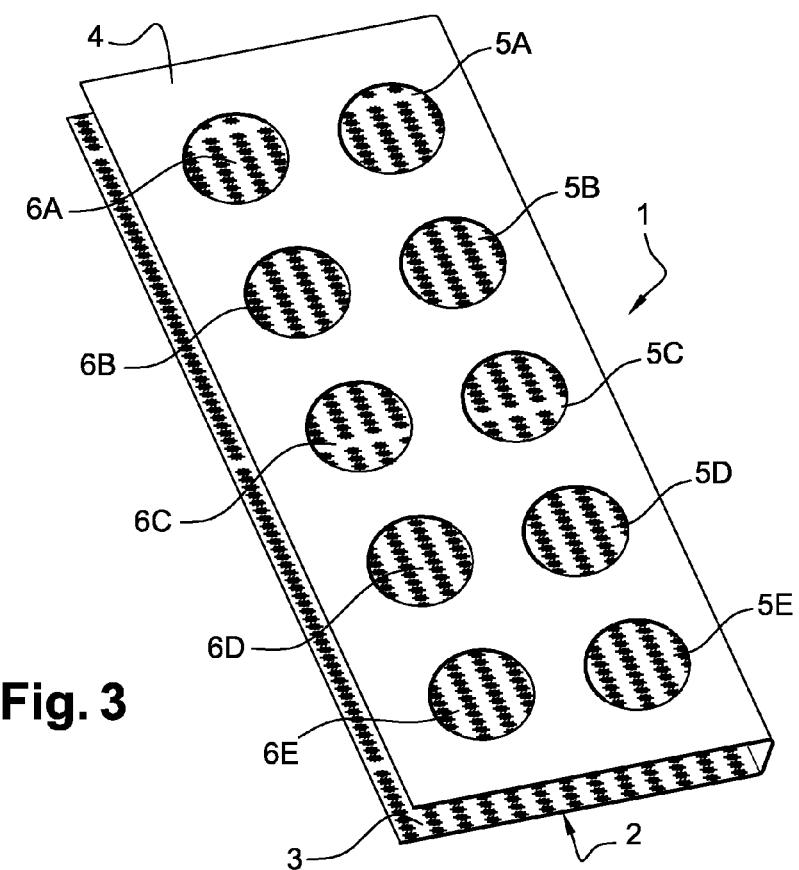

Fig. 4A

Souvent tournés vers l'esthétique, les traitements des verres contribuent aussi à améliorer vos capacités visuelles ou à vous simplifier la vie côté pratique. Le traitement durcisseur, réservé aux verres organiques est quasi-systématique sur les verres Essilor. Ce traitement améliore la durée de vie de vos verres en augmentant leur résistance aux rayures. L'antireflet : avec ce traitement, vous bénéficiez d'une vision plus précise grâce à des verres plus transparents. Votre regard est ainsi mis en valeur. Sur les verres organiques Essilor, ce traitement est couplé au traitement durcisseur et à un anti-salissures. Souvent tournés vers l'esthétique, les traitements des verres contribuent aussi à améliorer vos capacités visuelles ou à vous simplifier la vie côté pratique. Le traitement durcisseur, réservé aux verres organiques est quasi-systématique sur les verres Essilor. Ce traitement améliore la durée de vie de vos verres en augmentant leur résistance aux rayures. L'antireflet : avec ce traitement, vous bénéficiez d'une vision plus précise grâce à des verres plus transparents. Votre regard est ainsi mis en valeur. Sur les verres organiques Essilor, ce traitement est couplé au traitement durcisseur et à un anti-salissures. Souvent tournés vers l'esthétique, les traitements des verres contribuent aussi à améliorer vos capacités visuelles ou à vous simplifier la vie côté pratique. Le traitement durcisseur, réservé aux verres organiques est quasi-systématique sur les verres Essilor. Ce traitement améliore la durée de vie de vos verres en augmentant leur résistance aux rayures.

DEVICE FOR DEMONSTRATING AND TESTING THE COSMETIC QUALITIES OF AN OPHTHALMIC LENS

RELATED APPLICATIONS

This application is a National Phase application of PCT/FR2009/050906, filed on May 15, 2009, which in turn claims the benefit of priority from French Patent Application No. 08 53897, filed on Jun. 12, 2008, the entirety of which are incorporated herein by reference

BACKGROUND

1. Field of the Invention

The invention relates to a device for demonstrating and testing the cosmetic qualities of an ophthalmic lens.

2. Description of Related Art

The cosmetic qualities of a lens relate in particular to its resistance to abrasion, to the absence of scratches as a result of specific treatment, and to the absence of coloring in the material of the lens and/or its anti-reflection treatment.

It is known to evaluate the cosmetic level of a lens by looking at neon tube through the lens. However that method requires a trained eye to obtain a result that is reliable.

Furthermore, patent document U.S. Pat. No. 1,336,010 describes a device for testing an ophthalmic lens, which device comprises both a bearing wall for bearing against a fixed surface and provided on its face opposite from its bearing face with a viewing target, and also a wall for supporting the lens, which wall is placed at a distance of about 40 millimeters (mm) from the face of said bearing wall that is provided with the target.

That known device is not suitable for demonstrating and testing the cosmetic qualities of an ophthalmic lens.

That type of V-section device has a support wall that is inclined at an angle of 45° relative to the bearing wall and thus to the viewing target. As a result there is a large field of observation and the distance between the lens and the target is large and not constant. As a result the observer systematically concentrates little on evaluating the qualities of the lens.

Furthermore, such an arrangement gives rise to a shadow of the support wall that impedes observation. The non-uniformity of contrast of the shadow is also troublesome, it is projected onto the target, and the observer tends to look in that direction as a result.

Finally, when the observer looks at the target through the lens, such a device gives rise to a perspective effect that deforms the vision of the patterns of the target.

OBJECTS AND SUMMARY

The invention proposes a device for demonstrating and testing the cosmetic qualities of an ophthalmic lens, which device is simple to use, is capable of being used both as a demonstration device for opticians and as an instrument, and that is easily used by an untrained person. This device solves the problems mentioned above.

To do this, the invention proposes a device for demonstrating and testing the cosmetic qualities of an ophthalmic lens by viewing, the device comprising both a bearing wall for bearing against a fixed surface and provided on its face opposite from its bearing face with a viewing target, and also a support wall for supporting said lens and placed at a distance lying in the range 20 mm to 50 mm from said face of said bearing wall that is provided with the target, the device being characterized in that it is constituted by a support part constituted by a channel-section member having its flanges forming said bearing surface and said support wall, the support wall being provided with at least one orifice of dimensions smaller than the dimensions of said lens, and said bearing surface and said support surface being inclined relative to each other by an angle lying in the range 0° to 25°.

The rather small inclination of the support wall relative to the bearing wall also serves to avoid the perception of cosmetic quality differing between the top of the lens and the bottom of the lens.

This small inclination also ensures less sensitivity to ambient lighting and to the effects of the shadow of the support wall on the target.

In a preferred embodiment, said support part is made of transparent plastics material.

Preferably, said support wall is coated on the outside with a mat black coating.

Said support wall may be inclined relative to said bearing wall.

Said distance is preferably about 25 mm.

Preferably, said orifice is circular.

Said lens may be fastened to said support wall.

The invention relates in particular to such a device for demonstrating and testing the abrasion of an ophthalmic lens by viewing, the device being characterized in that the target presents a mat white background and mat black patterns.

Preferably, the viewed surface of the target comprises substantially 21% to 45% black patterns.

Advantageously, said patterns present white space between one another.

The target may be an acuity chart, in particular a Parinaud eye-test chart.

The invention relates to the use of such a device, including a said orifice, the use being characterized in that it consists in considering a said lens substantially centered on said orifice and in viewing the target.

The invention relates to the use of such a device having two of said orifices in order to demonstrate and test the cosmetic qualities of an ophthalmic lens, the use being characterized in that it consists in considering a said reference lens substantially centered on one of said orifices and in considering a said lens for testing substantially centered on the other one of said orifices, in looking at the target in succession through each lens, and in determining the quality of said tested characterized by considering the viewed image.

Preferably, for demonstrating and testing the abrasion of a lens, said reference lens and said lens for testing have been subjected to the same abrasion test.

The invention also relates to the use of such a device having two parallel rows of n said orifices in order to demonstrate and test the cosmetic qualities of an ophthalmic lens, the use being characterized in that it consists in considering n said ordered reference lenses substantially centered on said orifices of one row and in placing a said tested lens substantially centered on said orifices of the other row, in looking at the target in succession through each lens and in determining the reference lens that corresponds to the tested lens, by comparing the viewed images.

Preferably, said viewing is performed in near vision by a human observer.

Advantageously, each said lens has power of zero.

BRIEF DESCRIPTION OF THE DRAWINGS

The invention is described below in detail with reference to figures that merely show preferred embodiments.

FIGS. 2A and 2B are perspective views of a second embodiment of a demonstration and test device in accordance with the invention.

FIG. 3 is a perspective view of a third embodiment of a demonstration and test device in accordance with the invention.

FIGS. 4A to 4C are views of different viewing targets for implementing a demonstration and test device in accordance with the invention.

DETAILED DESCRIPTION

Figure 1:
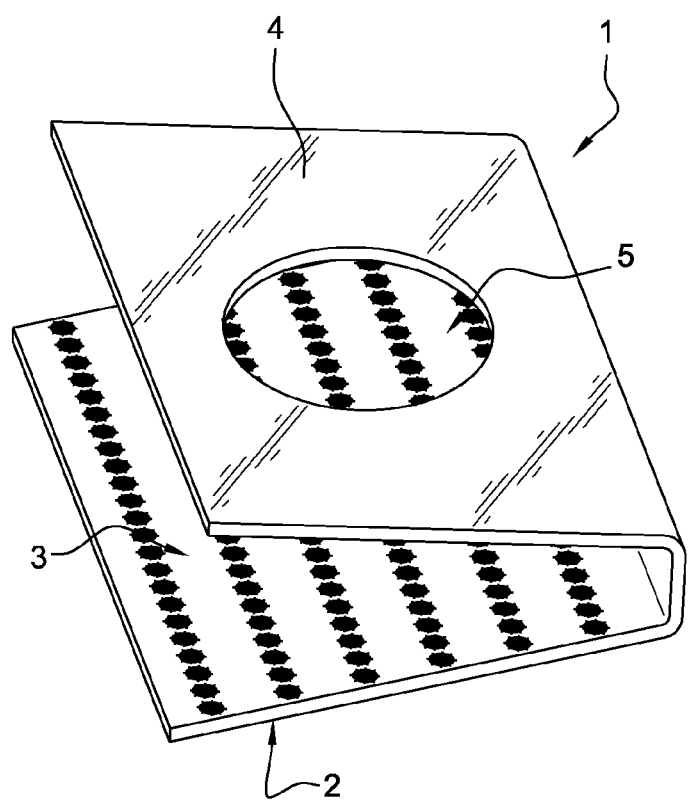
FIG. 1 is a perspective view of a first embodiment of a demonstration and test device in accordance with the invention.

In the first embodiment, shown in FIG. 1, a demonstration and test device in accordance with the invention comprises both a support part 1 having a bearing wall 2 for bearing against a fixed horizontal surface and provided, on its face opposite from its bearing face, with a viewing target 3, and also a support wall 4 for supporting a lens that is placed at a distance lying in the range 20 mm to 50 mm above the face of the bearing wall provided with the target 3, and that is itself provided with an orifice 5 of dimensions smaller than those of the tested lens.

The support wall 4 is shown slightly inclined relative to a horizontal plane, however it could equally well be parallel to the bearing wall 3 by using an inclined support base. This angle of inclination is less than 25° so as to allow the observer to take up a posture that is comfortable and avoid interfering reflections due to lighting.

The support wall 4 is coated on its outside with a mat black coating, e.g. of baize.

The device is for demonstrating or testing a finished lens and the orifice 5 is circular.

The device is used as follows.

A lens is placed or fastened on the support wall 4 substantially centered on the orifice 5, and a person looks at the target 3 through the lens. Depending on the appearance of the target, the cosmetic quality of the lens can be observed.

In the second embodiment, shown in FIGS. 2A and 2B, a demonstration and test device in accordance with the invention comprises both a support part 1 having a bearing wall 2 placed on a fixed horizontal surface and provided on its face opposite from its bearing face with a viewing target 3, and also a lens support wall 4 that is placed at a distance lying in the range 20 mm to 50 mm above the face of the bearing wall that is provided with the target 3, and that is itself provided with two orifices 5A and 5B of dimensions smaller than the dimensions of the tested lenses.

The support wall 4 is shown as being slightly inclined relative to the horizontal plane, in order to facilitate observation, however it could also be parallel to the bearing wall 3, by using an inclined support base. The angle of inclination is less than 25° in order to enable the observer to take up a posture that is comfortable and in order to avoid interfering reflections due to lighting.

This device is for demonstrating or testing a finished lens and the orifices 5A and 5B are circular.

This device is used as follows.

As shown in FIG. 2B, a reference lens LR is placed or fastened on the support wall 4 substantially centered on one of the orifices 5A, and the lens L for testing is placed or fastened on the support wall 4 substantially centered on the other orifice 5B. The two lenses LR and L differ in their substrates or in their coatings. They have subsequently been subjected to the same abrasion test.

Lens abrasion may be performed in particular by means of an abrasion resistance test of the modified Bayer ISTM type. This test consists in simultaneously shaking a sample glass and a standard glass with determined reciprocating motion in a vessel containing an abrasive powder of defined grain size at a frequency of 100 cycles per minute for a duration of 2 minutes. The abrasion takes place over 600 cycles using approximately 1 kilogram (kg) of alumina (aluminum oxide $Al_2O_3$) ZF 152412 supplied by the supplier Ceramic Grains (previously Norton Materials, New Bond Street, P.O. Box 15137, Worcester, Mass. 01615-00137). The level of abrasion may thus be adjusted by modifying the number of cycles or the quantity of alumina used.

A person looks at the viewing target in succession through both of the lenses LR and L and determines the quality of the tested lens L. In the example shown, it can be seen that viewing through the tested lens presents better contrast and that the tested lens L is of a cosmetic quality that is better than that of the reference lens LR.

In a third embodiment, shown in FIG. 3, a demonstration and test device in accordance with the invention comprises both a support part 1 having a bearing wall 2 bearing against a horizontal surface and provided, on its face opposite from its bearing face, with a target 3, and also a lens support wall 4 that is placed at a distance lying in the range 20 mm to 50 mm above the face of the bearing wall that is provided with the target 3 and that is provided with ten orifices 5A to 5E and 6A to 6E arranged in two rows, and of dimensions that are smaller than the dimensions of the tested lenses.

The support wall 4 is shown parallel to the bearing wall 3, however it could equally well be slightly inclined relative to a horizontal plane.

The device is for demonstrating or testing a finished lens and the orifices are circular.

This device is used as follows.

Five ordered reference lenses are placed or fastened on the support wall 4, substantially centered on the orifices 5A to 5E of the first row. These lenses may in particular be identical as to their substrates and as to their coatings, and they have subsequently been abraded uniformly over a diameter that is greater than or equal to the diameter of the orifices. The lenses may in particular be abraded by means of an abrasion resistance test of the Bayer ISTM type, by modifying the number of cycles and/or the amount of alumina used so as to obtain different levels of abrasion for each of the reference lenses.

A tested lens is then placed substantially centered on the various orifices 6A to 6E in the other row and a person looks at the target through these lenses, and by comparison determines which reference lens corresponds to the tested lens, and thus determines its cosmetic quality.

Naturally, although this example makes use of two rows of five orifices, this number n may be selected depending on requirements and on the degree of fineness of the test. Similarly, the abrasion of each of the reference lenses may be adjusted according to requirements and to the degree of fineness of the test.

As mentioned above, such devices are for demonstrating and testing finished ophthalmic lenses. The diameter of the orifices 5 is thus selected to be substantially equal to 50 mm, corresponding to the abraded diameter of such lenses. The distance between the orifices 5, when the device has a plurality of orifices, is of the order of 25 mm, so that the lenses can be centered on the orifices 5 while remaining relatively close to one another, so as to facilitate observation and comparison thereof.

The support part 1 of U-shaped section may be made of transparent plastics material, e.g. of Plexiglass or of polycarbonate.

The support wall 4 is coated on the outside with a mat black coating, e.g. of baize. The black color constrains the observer to look through the orifice(s) 5. The use of baize is particularly advantageous when the lenses are placed on the support wall 4 so as to prevent them from sliding.

With the help of such devices, the invention consists more particularly in demonstrating and/or testing abrasion of an ophthalmic lens by observations made by a person, consisting in placing the lens at a distance lying in the range 20 mm to 50 mm and preferably equal to about 25 mm above a viewing target 3 presenting a mat white background and mat black patterns, and in viewing the target 3 from a distance lying in the range 20 cm to 80 cm, so as to determine the quality of abrasion, by considering the contrast of the viewed image. This demonstration or test is preferably performed in near vision with the distance between the person's eye and the target lying in the range 33 centimeters (cm) to 40 cm, depending on the size of the person.

The distance of 25 mm serves to reveal a difference in contrast between the images visible through the lenses.

For example, the angle of inclination relative to the vertical is about 30°.

Figure 4B:
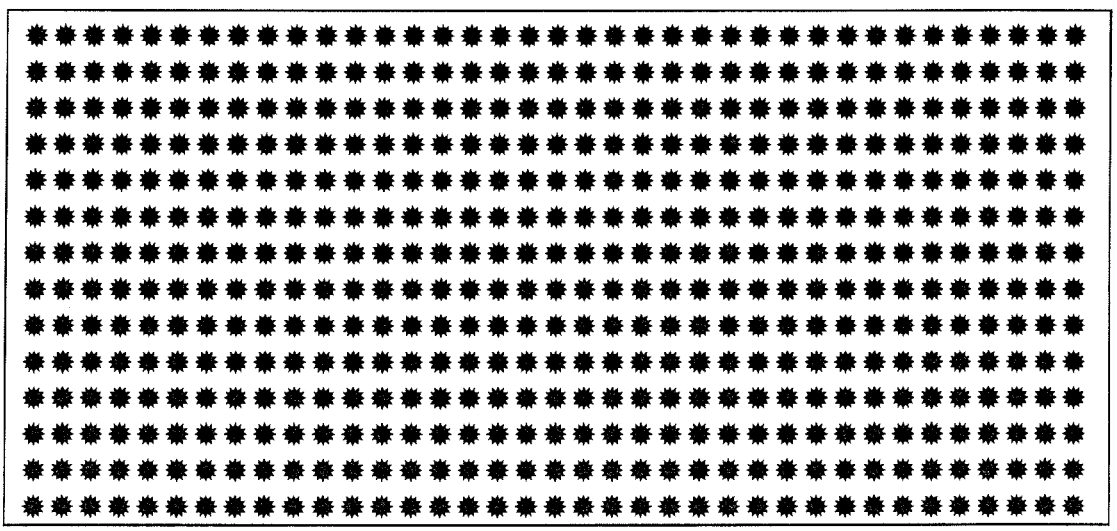
Figure 4C:
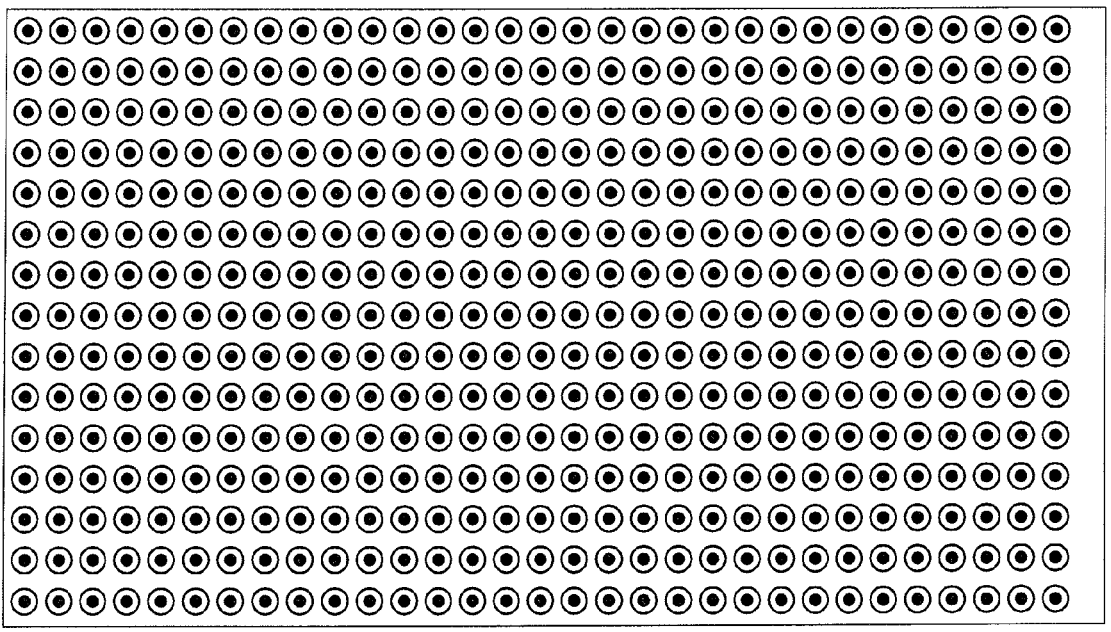

It is found that this method gives good results when the viewed surface of the target comprises 20% to 45% black patterns relative to the total viewed area, like the sample patterns shown in FIGS. 4A to 4C. Preferably, a target is chosen having a viewed area comprising substantially 70% white and 30% black. The patterns of the targets present at least a small amount of white space between one another.

The viewing target may be text with characters of a size that is equivalent to level P6 on a Parinaud eye-test chart viewed from 33 cm, as shown in FIG. 4A. The Parinaud eye-test chart is a conventional test used for evaluating acuity of near vision.

The viewing target is preferably printed on paper without any bleaching agent in order to have good whiteness. The paper preferably has no roughness and no grain. Using the colors black and white ensures the patterns have contrast of 100% relative to the white background.

In use of such devices, it is desirable to avoid any residual reflection.

Lighting is preferably natural. With artificial lighting, it is preferable for it to be non-direct and at a distance of the order of 1.50 meters (m), and to use daylight type D40 bulbs, of the kind conventionally used in the premises of opticians.

Apart from people having some specific vision problem, the device is used in binocular vision with optimum vision acuity and with or without correction.

Advantageously, each tested lens has a power of zero.

The invention is not limited to the characteristics of the embodiments described more particularly above.

Instead of relying on human vision, it is possible to use a system comprising a camera and image analysis software for taking the target 3 into consideration through the lens(es), thereby testing a lens more automatically.

As described above, the device may be used as a demonstration tool by opticians, in order to demonstrate anti-abrasion properties, or to show the durability performance of lenses.

Such a device may also be used to evaluate the residual color of lenses or the color of anti-reflection treatment. Under such circumstances, the viewing target is adapted to the intended purposes, and may for example be colored.

The invention claimed is:

1. A device for demonstrating and testing the cosmetic qualities of at least one ophthalmic lens, the device comprising:
    a bearing wall having a bearing face for bearing against a fixed surface, said bearing wall provided on a face opposite from said bearing face a viewing target, said target presenting a mat white background and 20% to 45% coverage of mat black patterns, said mat black patterns presenting white spaces between one another; and
    a support wall for supporting said lens,
    wherein the device has a U-shaped channel-section member, made of only one piece of plastic material, the flanges of which form said bearing surface and said support wall, and
    wherein the support wall is provided with only one through-hole for each lens and at least one orifice of dimensions smaller than the dimensions of said lens, said through-hole being disposed at a distance of about 25 mm from said viewing target of said bearing wall, and
    wherein said bearing surface and said support surface are inclined relative to each other at an angle lying in the range of greater than 0° up to 25°.

2. A device according to claim 1, wherein said support part is made of transparent plastics material.

3. A device according to claim 1, wherein said support wall is coated on the outside with a mat black coating.

4. A device according to claim 1, wherein said orifice is circular.

5. A device according to claim 1, wherein said lens is fastened to said support wall.

6. A device according to claim 1, wherein the target is an acuity chart.

* * * * *